United States Patent [19]

Takagi et al.

[11] Patent Number: 4,910,068
[45] Date of Patent: Mar. 20, 1990

[54] MAGNETIC RECORDING MEDIUM

[75] Inventors: Hiroshi Takagi, Yokohama; Morimi Hashimoto, Wako; Nobuyuki Saito; Kenji Suzuki, both of Yokohama, all of Japan

[73] Assignee: Canon Kabushiki Kaisha, Tokyo, Japan

[21] Appl. No.: 151,310

[22] Filed: Feb. 1, 1988

[30] Foreign Application Priority Data

| Feb. 2, 1987 [JP] | Japan | 62-21995 |
| Feb. 2, 1987 [JP] | Japan | 62-21996 |
| Feb. 2, 1987 [JP] | Japan | 62-21997 |
| Feb. 2, 1987 [JP] | Japan | 62-021998 |
| Feb. 2, 1987 [JP] | Japan | 62-021999 |

[51] Int. Cl.$^4$ .................... G11B 5/00; G11B 00/00
[52] U.S. Cl. .................... 428/141; 427/131; 428/473.5; 428/694; 428/900
[58] Field of Search ............ 428/694, 141, 900, 473.5; 427/131

[56] References Cited

U.S. PATENT DOCUMENTS

| 4,474,843 | 10/1984 | Miyoshi et al. | 427/131 |
| 4,528,240 | 7/1985 | Miyoshi et al. | 427/131 |
| 4,578,729 | 3/1986 | Suzuki et al. | 428/694 |
| 4,612,235 | 9/1986 | Ushimaru et al. | 427/131 |
| 4,619,856 | 10/1986 | Kamada et al. | 428/694 |
| 4,664,941 | 5/1987 | Washburn | 427/131 |

Primary Examiner—Paul J. Thibodeau
Attorney, Agent, or Firm—Fitzpatrick, Cella, Harper & Scinto

[57] ABSTRACT

A magnetic recording medium comprises a substrate composed of a polyimide film bearing, on a face thereof, a polyimide coated layer containing inorganic particles dispersed therein, and a magnetic recording layer formed on said polyimide coated layer.

A magnetic recording medium comprises a substrate composed of a polyimide film containing inorganic particles dispersed therein and bearing, on a face thereof, a polyimide coated layer containing inorganic particles dispersed therein, and a magnetic recording layer formed on the other face of said polyimide film, wherein the average particle size of the inorganic particles dispersed in said polyimide film is smaller than that of the inorganic particles dispersed in said polyimide coated layer.

A magnetic recording medium comprises a magnetic recording layer formed by a thin film deposition process on a substrate, wherein said substrate is provided, on the surface thereof, with small projections with a density of $10^5$ to $10^8$ projections/mm$^2$, and the statistical distribution of the heights of said projections satisfies following relations $H_{0.01} < 600$ Å, $H_{0.1} > 120$ Å, $H_1 > 100$ Å and $H_{0.1} - H_1 < 200$ Å, in which $H_{0.01}$, $H_{0.1}$ and $H_1$ are the heights of projections respectively corresponding to 0.01%, 0.1% and 1% of the total number of projections in the descending order of height.

A magnetic recording medium comprises a magnetic recording layer formed by a thin film deposition process on a substrate containing inorganic particles dispersed therein, wherein said substrate is provided, on the surface thereof, with small projections with a density of $10^5$ and $10^8$ projections/mm$^2$, wherein said inorganic particles are mostly dispersed to the level of primary particles, and wherein the distribution of the heights of projections on the surface of the substrate satisfies following relations:

$$H_{0.01} < (1 + \sigma)d$$
$$H_{0.01} > 120\text{Å}$$
$$H_1 > 0.35d$$

in which d is the average particle size of the inorganic particles; $\sigma$ is the deviation in said particle size; and $H_{0.01}$, $H_{0.1}$ and $H_1$ are the heights of projections respectively corresponding to 0.01%, 0.1% and 1% of the total number of projections in the descending order of height.

11 Claims, 10 Drawing Sheets (a)

(b)

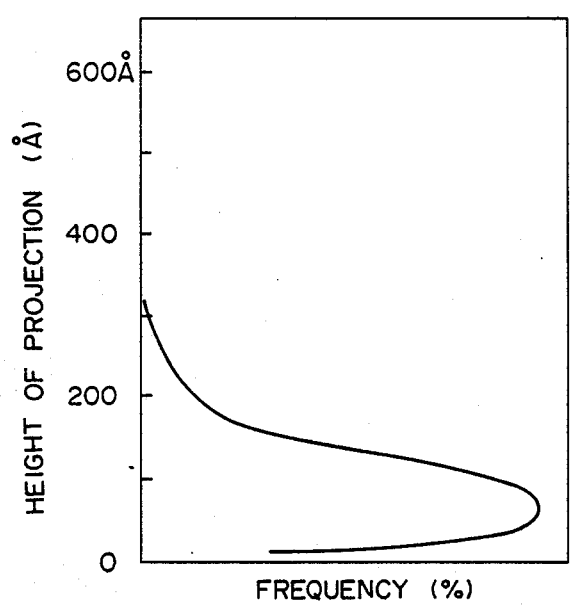
F I G. 15

MAGNETIC RECORDING MEDIUM

BACKGROUND OF THE INVENTION

1. Field of the Invention

The present invention relates to a magnetic recording medium with improved running characteristic.

2. Related Background Art

A magnetic recording medium having a magnetic recording layer composed of a ferromagnetic metal film, a ferromagnetic oxide film or a ferromagnetic nitride film shows excellent high density recording capability. Such film can be composed, for example, of Co, Co-Ni, Co-Cr, cobalt oxide or barium ferrite. Such films can be produced by thin film deposition processes, such as vacuum evaporation, sputtering or ion plating which is featured by good production efficiency and good control on electromagnetic characteristics.

The magnetic recording media prepared with such thin film deposition processes show excellent electromagnetic properties, but are not yet practically acceptable since they are significantly inferior in the running durability to the conventional coated media. Particularly the medium utilizing Co-Cr alloy film has yet to be improved in the practical durability.

Attempts for improving the running durability of such media utilizing metal magnetic film has been made in following two directions.

The first approach is to effect an improvement on the surface of the magnetic recording layer, either by providing a protective function or a lubricating function thereto, by modifying materials or process.

The second approach is to form minute coarseness on the surface of the magnetic recording layer, or on the surface of substrate not bearing the magnetic recording layer. Very small projections or modulations formed on the surface of the magnetic recording layer significantly improve the durability in comparison with the smooth surface.

However these methods inevitably result in an increased spacing loss, so that a highly advanced technology is required for improving the durability while maintaining the excellent electromagnetic conversion characteristics of the metal magnetic film.

The effort of the present inventors has been directed to the above-mentioned second approach.

A magnetic film prepared for example by sputtering on a substrate film having a coarse surface also shows a coarse surface reflecting the surface coarseness of said substrate film. It is already known that a film with such coarse surface contributes to an improvement in the running durability of the magnetic recording medium, as disclosed in the Japanese Laid-open Patent No. 127523/1985.

A coarse surface of an organic film can be obtained, for example, by mixing particles for forming projections into the raw material in liquid state before film formation, by coating dilute solution containing said particles after film formation thereby forming projections after drying, by utilizing precipitates from catalyst residue or soluble catalyst, or by forming very small reticulations through crystallization in the film formation. The last two methods are principally utilized for improving the slidability of polyester films and utilize process features specific to polyester films. The first two methods are suitable for heat-resistant films such as polyimide or polyamide which are formed by casting, but the method of forming projections by causing the filler particles to project is advantageous in the simplicity of process and in achieving a low-cost industrial production. However simple mixing of filler particles into an organic film, particularly a polyimide film, does not achieve improvement in the running performance and durability o magnetic recording medium, and a further improvement has been longed for.

SUMMARY OF THE INVENTION

In consideration of the foregoing, the object of the present invention is to provide a magnetic recording medium excellent in durability and running performance.

The magnetic recording medium of the present invention is featured by a substrate consisting of a polyimide film bearing, on a face thereof, a polyimide coated layer in which inorganic particles are dispersed, and a magnetic recording layer formed either on the other face of said polyimide film or on said polyimide coated layer.

Also the magnetic recording medium of the present invention is featured by a substrate consisting of a polyimide film, in which inorganic particles are dispersed, bearing, on a face thereof, a polyimide coated layer in which inorganic particles are dispersed, and a magnetic recording layer formed on the other face of said polyimide film, wherein the average particle size of the inorganic particles dispersed in said polyimide film is smaller than that of the inorganic particles dispersed in said polyimide coated layer.

According to one aspect of the present invention, there is provided a magnetic recording medium comprising a magnetic recording layer formed by a thin film deposition process on a substrate, wherein said substrate is provided, on the surface thereof, with small projections with a density of $10^5$ to $10^8$ projections/mm$^2$, and the statistical distribution of the heights of said projections satisfies following relations $H_{0.01} < 600$ Å, $H_{0.1} > 120$ Å, $H_1 > 100$ Å, and $H_{0.1} - H_1 < 200$ Å, in which $H_{0.01}$, $H_{0.1}$ and $H_1$ are the heights of projections respectively corresponding to 0.01%, 0.1% and 1% of the total number of projections in the descending order of height.

According to another aspect of the present invention, there is provided a magnetic recording medium comprising a magnetic recording layer formed by a thin film deposition process on a substrate containing inorganic particles dispersed therein, wherein said substrate is provided, on the surface thereof, with small projections with a density of $10^5$ to $10^8$ projections/mm$^2$, wherein said inorganic particles are mostly dispersed to the level of primary particles, and wherein the distribution of the heights of projections on the surface of the substrate satisfies following relations:

$$H_{0.01} < (1 + \sigma)d$$

$$H_{0.1} > 120 \text{ Å}$$

$$H_1 > 0.35d$$

in which $d$ is the average particle size of the inorganic particles; $\sigma$ is the deviation in said particle size; and $H_{0.01}$, $H_{0.1}$ and $H_1$ are the heights of projections respectively corresponding to 0.01%, 0.1% and 1% of the total number of projections in the descending order of height.

BRIEF DESCRIPTION OF THE DRAWINGS

FIGS. 5 to 8 and 11 to 15 are charts showing examples of distribution of small projections on the surface of the magnetic recording medium;

DETAILED DESCRIPTION OF THE PREFERRED EMBODIMENTS

Figure 1:
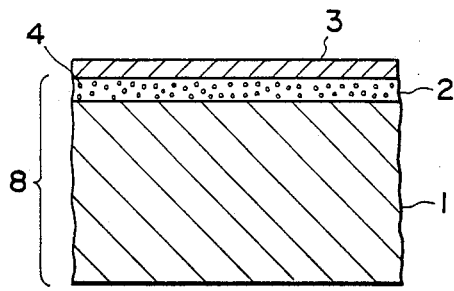
FIGS. 1 to 3 are cross-sectional views of embodiments of tee magnetic recording medium of the present invention.

An example of a magnetic recording medium of the present invention shown in FIG. 1 is composed of a substrate 8 consisting of a polyimide film 1 bearing, on a face thereof, a polyimide coated layer 2 in which inorganic particles 1 are dispersed, and a magnetic recording layer 3 formed on said polyimide coated layer 2.

The polyimide film 1 is ordinarily prepared by casting solution of a polyamide acid obtained by polymerizing an aromatic tetracarboxylic acid and an aromatic diamine on a flat surface, and by imitation at an elevated temperature after the removal of solvent. Examples of the aromatic tetracarboxylic acid include pyromellitic dianhydride, 3,3',4,4'-biphenyltetracarboxylic dianhydride, pyridine-2,3,5,6-tetracarboxylic dianhydride and 2,3,6,7-naphthalenedicarboxylic dianhydride, and examples of the aromatic diamine include paraphenylene diamine, diaminodipeenylether, diaminodiphenylmethane, diaminodiphenylsulfone and diaminonaphthalene. Particularly preferred is the use of pyromellitic dianhydride (PMDA) or 3,3',4,4'-biphenyltetracarboxylic dianhydride (BPDA) as the tetracarboxylic acid and of parapheylenediamine (PPD) or diaminodiphenylether (DADE) as the diamine. These components may be simply polymerized, but copolymerization of three or four of these four components allows to obtain a polyimide film 1 having desirable thermal or mechanical properties for the substrate of the magnetic recording medium.

For obtaining suitable mechanical and thermal properties for the magnetic recording medium, the diamine components used for forming the aromatic polyamic acid are preferably composed of PPD in an amount of about 40–95 mol. %, particularly 45–90 mol. % of all the diamine components and DADE in an amount of about 5–60 mol. %, particularly 10–55 mol. %. Also the tetracarboxylic acid components used for forming the aromatic polyamic acid are preferably composed of BPDA in an amount of about 10–90 mol. %, particularly 15–85 mol. % of all the tetracarboxylic acid components, and PMDA in an amount of about 10–90 mol. %, particularly 15–85 mol. %.

The polyamic acid, which is used in the polyamic acid solution (forming the polyimide coated layer 2 after imidation) to be located on the polyamic acid film (forming the polyimide film 1 after imidation) may be same as or different from that of the polyimide film 1. Sufficient adhesion is difficult to obtain if the polyamic acid solution is coated o the polyimide film 1 after complete imidation thereof. For obtaining strong adhesion between the polyimide film 1 and th polyimide coated layer 2, it is preferable to case polyamic acid solution, obtained by mixing tetracarboxylic acid and diamine in a solvent, on a flat metal or glass plate, then evaporating the solvent to obtain a polyamic acid film, coating thereon polyamic acid solution containing inorganic particles 4 for forming the polyimide coated layer 2, and effecting imidation by polymerization at an elevated temperature.

The polyimide coated layer 2 can be formed by a roller coating method such as gravure roller coating or reverse roller coating, a bar coating method or a spin coating method, and a certain surface coarseness is obtained on the substrate 8 (consisting of a laminate of polyimide film 1 and polyimide coated layer 2) by the polyimide coated layer 2 formed by subsequent imidation, and containing the inorganic particles 4 therein.

In addition to polyimide, the substrate 8 may also be composed of a material of sufficient thermal resistance, such as polyamide, polyimidamide, polyetherimide or polysulfon. The substrate 8 should have a glass transition point at least equal to 200° C., preferably at least equal to 250° C.

The inorganic particles 4 are preferably fine particles of carbon, a metal such as Cu, Ag, Au, Zn, Al, Fe, Co, Ni or W; a metal oxide such as $Al_2O_3$, $SiO_2$, $TiO_2$, $ZrO_2$, $HfO_2$ or MgO; or another material such as $MgCO_3$, $CaCO_3$, $CaSO_4$ or $BaSO_4$. The particle size and the content of the inorganic particles 4 are regulated according to the desired surface coarseness. The surface coarseness of the substrate for the magnetic recording medium is preferably represented by a ten-point-averaged coarseness Rz (measured with Talistep, manufactured by Taylow Hobson Co.) in a range of 100–600 Å and a projection density in a range of $10^5$–$10^8$ projections/$mm^2$. A magnetic recording medium prepared by forming a magnetic recording layer 3 on a substrate 8 having the above-mentioned coarseness shows an improvement in the running performance and the durability due to reduced friction. A coarseness Rz below the above-mentioned range tends to show insufficient reduction in the friction or insufficient improvement of the durability, while a coarseness Rz exceeding said range tends to result in an increased spacing loss between the magnetic head and the magnetic recording medium, thereby reducing the reproduction output signal. Also a projection density below the above-mentioned range tends to show insufficient improvement in the durability while a density exceeding said range tends to result in large projections caused by agglomeration of particles, thus leading to drop-outs. For obtaining the above-mentioned surface coarseness, the average particle size of the inorganic particles 4 is preferably in a range of 0.02–0.1μ, particularly 0.03–0.07μ. The surface coarseness of tee magnetic recording layer is equal to that of the substrate if said layer is formed by a thin film deposition process.

The magnetic recording layer 3 is preferably composed of a ferromagnetic alloy, a ferromagnetic oxide or a ferromagnetic nitride, based principally on Fe, Ni or Co. More specifically there is preferred a ferromagnetic film of a coercive force at least equal to 300 Oe and a thickness of 0.05–1μ, composed of Fe, Co, Co-Ni, Co-P, Co-Pt, Co-Cr, Co-Cr-Ta, Co-V, Co-Rh, Co-O, Co-Ni-O, Co-N, Fe-N etc. and formed by vacuum evaporation, sputtering or plating. Particularly preferred is a Co-based magnetic recording layer such as Co-Cr, Co-Cr-Ta, Co-V, Co-Rh or Co-O having vertical magnetic anisotropy with an easy direction of magnetization vertical to the film surface and thus showing good high-density recording characteristics. The magnetic recording layer 3 may be composed of a single layer, or laminated with another magnetic or non-magnetic layer.

The magnetic recording layer 3 has a thermal expansion coefficient generally in a range of $1$-$2 \times 10^{-5}$, and said coefficient of the polyimide substrate 8 should preferably have a similar coefficient, more specifically in a range of $0.7$-$2.5 \times 10^{-5}$.

The magnetic recording layer 3 consisting of a metal, oxide or nitride film does not have, by itself, a sufficiently high abrasion resistance to the magnetic head or other components of the recording equipment, or a sufficiently high corrosion resistance. For this reason the magnetic recording layer 3 is preferably provided thereon with a protective or lubricating layer composed for example of oxide, nitride, carbide or boride of a metal; a carbon film; a higher fatty acid, a higher fatty acid ester, a fluorinated oil, perfluorocarboxylic acid or a fluorinated resin. Specific examples of the material of such layer includes $SiO_2$, $Al_2O_3$, $Co_3O_4$, $TiN$, $Si_3N_4$, $BN$, $SiC$, $WC$, $ZrB_2$, $HfB_2$, stearic acid, metal stearate, perfluoroalkyl polyether, PTFE, FEP and acrylesters. The materials of said protective or lubricating layer may be used singly or in combination.

The friction coefficient of the magnetic recording layer 3 can be brought to a practical range by means of the fine coarseness of the polyimide coated layer 2 formed on the polyimide film and the formation of a lubricating layer, but, in the use as a magnetic recoding tape it is desirable to reduce the friction coefficient by forming a suitable back coating layer also on a face opposite to the magnetic recording layer 3. Such back coating layer is preferably composed of a coating in which fine particles for example of carbon black, graphite, $SiO_2$, $Al_2O_3$, $TiO_2$ or $CaCO_3$ in a binder such as polyurethane, polyester, vinyl chloride or nitrocellulose.

Figure 2:
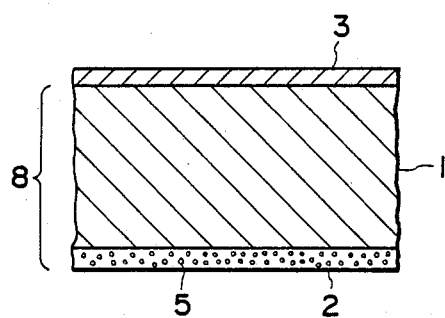

FIG. 2 shows another embodiment of the magnetic recording medium of the present invention, which is composed of a substrate 8 consisting of a polyimide film 1 bearing, on a face thereof, a polyimide coated layer 2 in which inorganic particles 5 are dispersed, and a magnetic recording layer 3 formed on the other face of said substrate.

The inorganic particles 5 can be composed, as in the foregoing embodiment shown in FIG. 1, of fine particles of carbon, a metal or a metal oxide such as $Al_2O_3$, $SiO_2$, $TiO_2$ or $MgO$. The particle size and content of said inorganic particles are regulated according to the surface coarseness to be formed, which is preferably represented by the ten-point-averaged coarseness Rz in a range of 0.05-0.5 μm and the projection density at least equal to $10^4$ projections/mm$^2$.

In the structure shown in FIG. 2, the polyimide coating 2 may be formed on either face of th polyimide film 1, in terms of formation of projections. The polyimide film 1 is formed by casting polyamic acid solution on a flat support member composed of stainless steel or glass, followed by removal of solvent and polyimidation, so that the surface coarseness of the polyimide film at the face contacting said support member reflects the surface coarseness of said support member. Even if said support member is composed of highly polished stainless steel, it is difficult to obtain, at said contacting face, a flatness required for the surface of the magnetic recording layer 3. It is consequently desirable to form the polyimide coated layer 2 on a face of the polyimide film 1 contacting said support member, and to form the magnetic recording layer 3 on the other free face of said polyimide film 1.

The above-mentioned laminate structure of the substrate 8 consisting of a layer free from the inorganic particles and another layer containing the dispersed inorganic particles provides an advantage that it is not associated with a loss in the mechanical strength encountered if the inorganic particles are dispersed in a large amount in the entire substrate 8. The magnetic recording media shown in FIG. 1 or 2 has a sufficiently high mechanical strength combined with desired surface properties, since the mechanical strength depends on the polyimide film 1 free from the inorganic particles, representing a major portion of the thickness.

In comparison with the conventional magnetic recording media with a back coating, the magnetic recording medium shown in FIG. 2 shows a better film running performance in the manufacture of the magnetic recording medium and shows less blocking in the storage of the substrate film prior to the manufacture, since surface coarseness is formed before the formation of the magnetic recording layer. Also the polyimide coating 2, forming said surface coarseness, is heat resistant and can withstand heating in the subsequent process steps.

Figure 3:
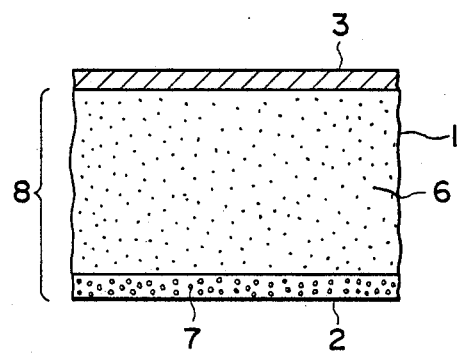

FIG. 3 shows another embodiment of the magnetic recording medium of the present invention, composed of a polyimide film 1 bearing, on a face thereof, a polyimide coated layer 2 in which inorganic particles 7 are dispersed; and, on the other face thereof, a magnetic recording layer 3, and, in said polyimide film 1, there are dispersed inorganic particles 6 of an average particle size smaller than that of the inorganic particles dispersed in the polyimide coating 2.

The magnetic recording medium shown in FIG. 3 can be prepared by casing polyamic acid solution, which is obtained by polymerizing an aromatic diamine and an aromatic tetracarboxylic acid in a solvent and dispersing inorganic particles 6 therein, on a support member such as a metal or glass plate, then eliminating the solvent to obtain a polyamic acid film, coating polyamic acid solution in which dispersed are inorganic particles 7 of an average particle size larger than that of the inorganic particles 6 on said polyamic acid film, then obtaining the polyimide film 1 by solvent removal and polyimidation, and forming the magnetic recording layer 3 on a face opposite to said polyimide coated layer 2.

The inorganic particles 6 form fine coarseness on the surface of the polyimide film 1 bearing the magnetic recording layer 3, thus improving the running performance and the durability of the substrate film itself or the magnetic recording medium. As the magnetic recording layer 3 is formed on the surface coarseness formed by the inorganic particles 6, the average particle size and the amount thereof are so determined as to obtain a satisfactory output from the magnetic recording layer 3 and to satisfy the requirements of running performance and durability. The surface coarseness, if too large in height, will cause a spacing loss leading to an insufficient short-wavelength output, and, if too small in height, is unable to satisfactorily improve the running performance and the durability. Also a low projection density cannot sufficiently improve the durability, but a large amount of inorganic particles if added for increasing the projection density will generate coagulation of the particles 6, creating large projections with a low density. Therefore the preferable surface coarseness of the magnetic recording layer 3 is represented by the ten-point-averaged coarseness in a range of 100–600 Å and the projection density in a range of $10^5$–$10^8$ projections/mm$^2$. The average particle size of the inorganic particles 6 is preferably in a range of 200–1000 Å, particularly 300–800 Å.

In the preparation of the substrate 8 for use in the present invention, at first a polyamic acid film is prepared by casting polyamic acid solution, containing said inorganic particles dispersed therein, on a flat stainless steel or glass surface and eliminating the solvent at 100°–150° C. Then polyamic acid solution, containing the inorganic particles 7, of an average particle size larger than that of the particles 6, dispersed therein is coated on the above-mentioned polyamic acid film by a coating method such as gravure coating or bar coating. The laminate polyamic acid film thus obtained is subjected to imidation at a higher temperature to obtain the substrate 8.

The surface coarseness formed by the inorganic particles 7 is higher than that formed by the inorganic particles 6, in order to satisfy desired output characteristics of the magnetic recording layer 03. The preferable surface coarseness formed by the inorganic particles 7 is represented by the ten-point-averaged coarseness in a range of 0.05–0.5 μm, and the projection density at least equal to $10^4$ projections/mm$^2$. The inorganic particles 7 may be composed of a material same as that of the inorganic particles 6, or may be composed of one of the materials cited before as suitable for the inorganic particles 6.

The polyimide coating 2 may be formed on either face of the polyamic acid film containing the inorganic particles 6 dispersed therein, but is preferably formed on a face of said film that has been in contact with a support member used for film casting. Even if polished flat, the support member for casting, composed for example of stainless steel, cannot achieve a smoothness required for the surface of the magnetic recording layer 3, and often has large projections exceeding 0.1 due to damaging during use, causing dropouts in the magnetic recording medium. For this reason the magnetic recording layer 3 is preferably formed on a face opposite to the face that has contacted said support member for casting. In addition a strong adhesion between the polyimide coating 2 and the polyimide film 1, by applying the polyamic acid solution for forming said polyimide coating 2, onto the polyamic acid film before the imidation step.

In the magnetic recording medium shown in FIG. 3, the inorganic particles 6 contained in the polyimide film 1 regulates the running performance of the polyimide film 1 alone, and the output characteristic and the durability of the magnetic recording layer 3 after the completion of the magnetic recording medium, so as to simultaneously satisfy these requirements. Also the inorganic particles 7 contained in the polyimide coating 2 improve the running performance of the substrate 8 and the magnetic recording material. Consequently the magnetic recording medium shown in FIG. 3 not only has excellent record/reproducing characteristics but also shows excellent practical properties such as the running performance and the durability. In addition, in the course of manufacture, the substrate film shows satisfactory running performance, and shows less blocking phenomenon in the storage of said film. Also the polyimide coating forming the coarseness is heat resistant and can withstand heating in the subsequent process steps.

The density, height etc. of the surface coarseness of the magnetic recording layer should preferably be controlled in a certain way, since otherwise there may result following drawbacks:

(1) If the projections are present in various heights, the contact state with the magnetic head is only defined by the highest ones only, so that most projections are not effective;

(2) Because of the fact (1), the height of the actually functioning projections cannot be controlled, so that the spacing between the medium and the magnetic head fluctuates according to the position, thus resulting in a variation in the electromagnetic conversion characteristic; and (3) As the effectively functioning projections are limited to the highest portion of the projections, the load is concentrated on such portion, thus causing abrasion.

Consequently the surface of the substrate 8 at the side of the magnetic recording layer 3 should preferably have small projections in a range of $10^5$–$10^8$ projections/mm$^2$ in average, and the heights $H_{0.01}$, $H_{0.1}$ and $H_1$ of projections respectively at 0.01%, 0.1% and 1% from the highest side in the height distribution of the projections should preferably satisfy following conditions $H_{0.01} < 600$ Å, $H_{0.1} > 120$ Å, $H_1 > 100$ Å and $H_{0.1} - H_1 < 200$ Å.

If the number of the projections on the surface of the substrate at the side of the magnetic recording layer 3 is less than $10^5$ projections/mm$^2$, the substrate tends to show a lowered sliding performance, thus eventually deteriorating the running performance and the durability in the course of manufacture of the magnetic recording medium or after the completion thereof. On the other hand, if said number exceeds $10^8$ projections/mm$^2$, the inorganic particles mixed in the substrate tends to coagulate, thus eventually creating large projections.

For the distribution curve f(h) of the height of projections on the surface of the magnetic recording layer of the magnetic recording medium, there stands, for example, following equation:

$$\int_{H_{0.01}}^{\infty} f(h)dh / \int_{0}^{\infty} f(h)dh = 0.0001.$$

In the evaluation of the magnetic recording medium of the present invention in terms of the luminance signal output, durability in still signal reproduction and durability in repeated running, there have been obtained following findings:

(A) The luminance signal output is governed by the spacing loss caused by the projection height $H_{0.01}$ or an even larger projection. Consequently a large value of $H_{0.01}$ induces an excessively large spacing loss, so that the capability of the magnetic recording layer cannot be fully exploited. Therefore preferred is a condition $H_{0.01} < 600$ Å, particularly $H_{0.01} < 350$ Å;

(B) The durability in still image reproduction is improved if the projections are present in a large number (practically about $10^5$–$10^8$ projections/mm$^2$) and are uniform in height, presumably because the load of the magnetic head is dispersed to decrease the abrasion of the magnetic recording medium. However the durability is deteriorated if the projections are too low, presumably because the abraded projections are no longer effective and enhance further abrasion, or because there is no longer a room for deposition of the powder generated by abrasion.

Uniform height of the projections is represented by mutually close values of $H_{0.01}$, $H_{0.1}$ an $H_1$. In practice there is preferred a condition $H_{0.01}-H_1 < 200$ Å, particularly $H_{0.1}-H_2 < 150$ Å. Under a condition $H_{0.1}-H_1 \geq 200$ Å, there often occurs head clogging, presumably caused by the powder generated by the abrasion of high projections by the magnetic head.

Also for improving the durability in still image reproduction, thee is preferred a condition $H_1 > 100$ Å since the projections of heights in the vicinity of $H_1$ are practically effective, as the larger projections smaller in number are soon abraded off;

(C) In the repeated reproduction, practically effective are projections of heights in the vicinity of $H_{0.1}$. Therefore, for improving the durability in repeated use, there is preferred a condition $H_{0.1} > 120$ Å, particularly $H_{0.1} > 180$ Å.

As explained in the foregoing, the density, height etc. of the surface coarseness of the magnetic recording layer 3 should preferably be controlled to a certain extent. However, the inorganic particles mixed in the substrate may not be dispersed to the primary particles. In the following there will be explained the control on the density, height etc. of surface coarseness of the magnetic recording layer 3 in consideration of the extent of dispersion of the inorganic particles.

When inorganic particles of a particle size in the order of 100–1000 Å are mixed in the substrate, there may be formed granules of the inorganic particles by coagulation of several particles to several hundred particles. A magnetic recording medium containing such granules will be associated with following drawbacks (4) and (5), in addition to the drawbacks (1) to (3) mentioned above:

(4) Such granules, if present mutually close, tend to mutually generate shadows in the formation of the magnetic recording layer by a thin film deposition process such as vacuum evaporation, thereby affecting the growth of rod crystals for example Co-Cr alloy and inducing abnormal growth of projections; and (5) Therefore abnormally high projections are generated, inducing frequent dropouts.

Thus, in consideration of the state of dispersion of the inorganic particles, the number of projections on the surface of the substrate is preferably in a range of $10^5$–$10^8$ projections/mm$^2$. It is also preferable that the inorganic particles are mostly dispersed to the state of primary particles, and that the height distribution of said projections on the surface of substrate satisfies following conditions:

$$H_{0.01} < (1 + \sigma)d$$

$$H_{0.1} > 120 \text{ Å}$$

$$H_1 > 0.35d$$

wherein d is the average particle size of the inorganic particles, $\sigma$ is the deviation in said average particle size, $H_{0.01}$ is the height of a projection corresponding to 0.01% of the number of projections from the highest side, $H_{0.1}$ is the height of a projection corresponding to 0.1% of the number of projections from the highest side, and $H_1$ is the height of a projection corresponding to 1% of the number of projections.

In the preparation of the substrate by casting a polyimide, polyamide or other heat resistant film containing dispersed inorganic particles, if said particles tend to coagulate, it is effective to pretreat the surface of said inorganic particles with a coupling agent thereby increasing the affinity with organic materials, and to effect dispersion (initial dispersion) while the organic material still has a high viscosity in the course of manufacture of the substrate.

The magnetic recording medium of the present invention, prepared in consideration of the dispersion of the inorganic particles, has been evaluated in terms of the luminance signal output, durability in still image reproduction and durability in repeated use as explained in the foregoing, and also in terms of dropouts, an following results have been found out:

(a) As stated before in (A), the luminance signal output is governed by the spacing loss caused by the projection height $H_{0.01}$ or even larger projections. Insufficient dispersion of the inorganic particles results in a condition $H_{0.01} > (1+\sigma)d$, so that he luminance signal output is determined by the coagulated granules of the particles, wherein d is the average particle size of said particles and $\sigma$ is the deviation of said average particle size. In such state the spacing loss is excessively large so that the specific capability of the magnetic recording layer cannot be fully exploited. Consequently, in consideration of the dispersion of the inorganic particles, there is preferred a condition $H_{0.01} < (1+\sigma)d$;

(b) As stated before in (B), the durability in still image reproduction is improved if the projections are present in a large number (practically in a range of about $10^5$–$10^8$ projections/mm$^2$) and are uniform in height. Also for obtaining a uniform height of the projections, it is preferable that a considerable portion of the particle size is in the projecting state in most of the dispersed inorganic particles, and numerically there is preferred a condition $H_1 > 0.35d$, particularly $H_1 > 0.5d$. In case of still image reproduction, practically effective are projections of heights in the vicinity of $H_1$, since larger projections which are fewer in number are soon abraded off;

(c) As stated before in (C), for improving the durability in repeated use, there is preferred a condition $H_{0.1} > 120$ Å, particularly $H_{0.1} > 180$ Å. For satisfying this condition with dispersed inorganic particles, the size of the particles has to have a certain magnitude, and it is preferable to use the inorganic particles with a particle size at least equal to 150 Å, more preferably at least equal to 225Å;

(d) A dropout was defined by a drop of 16 dB in the output level, with a duration of 15 μs. Dropouts are quite frequent when the inorganic particles form coagulated granules. Consequently a condition for absence of coagulation, $H_{0.01} < (1+\sigma)d$ has to be satisfied, preferably combined with an additional condition $H_{0.01} < 0.8d$.

The magnetic recording medium of the present invention is adapted for use, not only in magnetic tapes but also in flexible disks such as floppy disks and video floppy disks.

In case said magnetic recording medium is used as a disk, there is preferred a condition $H_1 > 0.42d$, particularly $H_1 > 0.55d$.

A magnetic recording medium with excellent electromagnetic conversion characteristic and running durability combined wit reduced dropouts can be obtained by dispersing the inorganic particles, to be dispersed in the substrate, to the level of primary particles and obtaining a uniform amount of projection from the surface of the substrate by means of suitable drying.

In the following the present invention will be clarified in further detail by examples thereof.

EXAMPLE 1

A polyamic acid solution obtained by dissolving parapheylenediamine in an amount of 30 mol. %, diaminodiphenylether in an amount of 70 mol. %, biphenyltetracarboxylic dianhydride in an amount of 50 mol. % and pyromellitic dianhydride in an amount of 50 mol. % in N,N-dimethylacetamide was cast on a smooth stainless steel belt, followed by elimination of solvent at 120° C., to obtain a polyamic acid film of about 15μ in thickness. On said film, the above-mentioned polyamic acid solution in which each of $SiO_2$ particles with an average particle size of 200, 400, 700, 1000 Å was dispersed was coated with a microgravure roller and dried at 120° C. Subsequently complete imidation was conducted in an oven of 400° C. to obtain four polyimide films of a total thickness of 9μ. Depending on the particle size of the $SiO_2$ particles, said polyimide films showed surface coarseness of projection heights and projection densities listed in Tab. 1.

On the coarse face of said polyimide film thus obtained, a magnetic layer composed of Co 80% Cr 20% was formed with a thickness of 0.35μ by high-frequency sputtering, while the polyimide film was hated to 150° C. On said Co-Cr film there were then formed a cobalt oxide film of 120 Å and a FEP film of 10 Å, thereby completing the magnetic recording tape. The magnetic tapes thus prepared were subjected to the measurement of the friction coefficient of the magnetic layer on a stainless steel rod of 4 mmφ (initial value and a value after glidings of 100 times), and the measurements of the RF output level and the durability time in still image reproduction in a modified commercial 8 mm-video tape player, and the obtained results are summarized in Tab. 1. Every tape showed satisfactory durability, without an output loss equal to or exceeding 3 dB for 20 minutes or more. Also the magnetic recording layer was not peeled off in a peeling test with a plastic adhesive tape.

EXAMPLE 2

A polyimide film of a total thickness of 9μ was prepared by reproducing the process in the Example 1, except that the aromatic diamines were composed of 60 mol. % of paraphenylenediamine and 40 mol. % of diaminodiphenylether, that the aromatic tetracarboxylic acids were composed of 70 mol. % of biphenyltetracarboxylic dianhydride and 30 mol. % of pyromellitic dianhydride, and that the $SiO_2$ particles were replaced by $TiO_2$ particles. On said polyimide film, after a plasma surface treatment, there were formed a Fe-Ni 80 wt. % film of a thickness of 0.3μ at room temperature and a Co-Cr 21 wt. % film of a thickness of 0.15μ after the heating of the polyimide film to 220° C., both by an electron beam heating vacuum vapor deposition method. Then, on said Co-Cr film there were formed a cobalt oxide film of a thickness of 100 Å and a film of an acrylester oligomer film having a perfluoro radical on a side chain with a thickness of 20 Å, for the purpose of protection and lubrication, thereby completing the magnetic tape. Said magnetic tape was subjected to the measurements of the adhesion, friction coefficient and durability time in still image reproduction in the same manner as in the Example 1. The magnetic tape showed satisfactory running performance and durability, as it showed no peeling, a friction coefficient of 0.21, and no output loss exceeding 3 dB over 60 minutes in the still image reproduction.

EXAMPLE 3

A polyamic acid film of a thickness of about 70μ was prepared utilizing paraphenylenediamine only as the aromatic diamine component also utilizing 80 mol. % of biphenyltetracarboxylic dianhydride and 20 mol. % of pyromellitic dianhydride as the aromatic tetracarboxylic acid components, but without heating to the complete imidation. On said film there was coated the above-mentioned polyamic acid solution in which dispersed were $SiO_2$ particles of an average particle size of 350 Å, followed by heating at 400° C. to obtain a polyimide film of a total thickness of 36μ. The $SiO_2$ particles dispersed in the polyimide coating produced fine coarseness with an average height of 170 Å and a projection density of $7 \times 10^6$ projections/mm². On said coarse face of the polyimide film there were formed a Co-Cr 20 wt. % film of a thickness of 0.4μ by sputtering at 150° C., and a carbon film of 300 Å by sputtering. The peeling test proved practically sufficient adhesion, without any peeling between the polyimide layers or any peeling of the magnetic recording layer. Also tee durability measurement made on a 3.5 inches floppy disk drive, after coating the carbon film with solution of perfluoroalkylpolyether as lubricant, showed an output loss of only 0.6 dB even after one million passes, indicating extremely good durability.

TABLE 1

|  | Inorganic particle | | Surface coarseness | | Friction Coefficient | | Adhesion | RF output (MP tape taken as 0 dB) | Still durability |
|---|---|---|---|---|---|---|---|---|---|
|  | material | average particle size | ten-point-average coarseness | projection density | 1st | 100th |  |  |  |
| Example 1 | $SiO_2$ | 200Å | 110Å | $2 \times 10^7$ | 0.29 | 0.33 | good | +4.5 dB | 24 minutes |
|  | $SiO_2$ | 400 | 190 | $8 \times 10^6$ | 0.22 | 0.24 | good | +3.0 dB | ≧60 minutes |
|  | $SiO_2$ | 700 | 320 | $3 \times 10^6$ | 0.21 | 0.22 | good | +0.6 dB | ≧60 minutes |
|  | $SiO_2$ | 1000 | 520 | $5 \times 10^5$ | 0.19 | 0.19 | good | −2.5 dB | ≧60 minutes |
| Example 2 | $TiO_2$ | 400 | 200 | $8 \times 10^6$ | 0.21 | 0.24 | good | +2.0 dB | ≳60 minutes |

EXAMPLE 4

A polyamic acid solution obtained by dissolving paraphenylenediamine in an amount of 30 mol. %, diaminodiphenyether in an amount of 70 mol. %, biphenyltetracarboxylic dianhydride in an amount of 50 mol. % and pyromellitic dianhydride in an amount of 50 mol. % in N,N-dimethylacttamide was cast on a smooth stainless steel belt, followed by elimination of solvent at 120° C., to obtain a polyamic acid film of about 15μ in thickness. On a face, that was in contact with said stainless steel belt, of said film, a polyamic acid solution of the same composition as explained above, in which dispersed were $TiO_2$ particles of an average particle size of 0.2 μm was coated with a gravure roller and dried at 120° C. This laminated polyamic acid film was subjected to complete imidation in an oven of 400° C. to obtain a polyimide film of a total thickness of about 9 μm. The polyimide coating had surface coarseness represented by the ten-point-averaged coarseness of 0.14 μm and the projection density of $4 \times 10^4$ projections/$mm^2$.

On the face opposite to said polyimide coating, a magnetic recording layer composed of a Co-Cr 20 wt. % film of a thickness of 0.3 μm was formed by high-frequency sputtering, and a protective layer composed of a cobalt oxide film of a thickness of 120 Å, principally consisting of $Co_3O_4$, was formed thereon. The medium was then slit in a width of 8 mm to obtain an 8-mm video tape. Said video tape was subjected to the measurement of the friction co-efficient of the face opposite to the magnetic recording layer on a stainless steel rod (SUS) of 4 mmφ, and the measurement of dropouts (defined as an output drop of 16 dB for a duration of 15 μs) in record/reproducing operations on an 8-mm video tape recorder. As shown in Table 2, the friction coefficient was small both at first and after 100 slidings, and the level of dropouts was also low. This video tape not only showed stable running on the video tape recorder, but was easy to handle without blocking, uneven running or uneven winding in the steps of tape manufacture. Also the peeling test with a plastic adhesive tape did not show the peeling of the polyimide coating.

EXAMPLE 5

An 8-mm video tap was prepared with the same materials and process as in the Example 4, except that $SiO_2$ particles of an average particle size of 0.08 μm were employed as the inorganic particles. The polyimide coating of said tape showed surface coarseness represented by the ten-point-averaged coarseness of 0.062 μm and the projection density of $7 \times 10^4$ projection/$mm^2$.

REFERENCE EXAMPLE 1

An 8-mm video tape was prepared by employing a polyimide film of the same composition as in the Example 4 but without the polyimide coating containing dispersed inorganic particles as the substrate, and forming a magnetic recording layer and a protective layer with the same materials and process as in the Example 4. The tape of this reference example showed a very low production yield in the steps of manufacture due to unevenness and wrinkles in winding. Also as shown in Table 2, a high friction coefficient result in poor running performance in the video tape recorder and defective winding on the cassette reel causing damages on the tape edges.

EXAMPLE 6

A polyimide film of a total thickness of 9 μm, including a polyimide coated layer containing dispersed inorganic particles, was prepared by reproducing the process of the Example 4 except that the aromatic diamine was solely composed of paraphenylenediamine and the aromatic tetracarboxylic acids were composed of 80 mol. % of biphenyltetracarboxylic dianhydride and 20 mol. % of pyromellitic dianhydride. On a face of said polyimide film, opposite to the polyimide coating, there was formed a magnetic recording layer of a thickness of 0.15 μm by oblique vapor deposition of Co-Ni 20 wt. % in a continuous electron beam vapor deposition apparatus. In this depositing operation, the upper portion of the Co-Ni layer was reacted with oxygen to form a Co-Ni oxide layer of a thickness of about 200 Å at the surface of said magnetic recording layer. The 8-mm video tape was completed by forming, on said magnetic recording layer, an FEP lubricating layer of a average thickness of 15 Å by vacuum vapor deposition method.

TABLE 2

| | Inorganic particles | | Friction coefficient | | Dropouts (number/ min) | Peeling test |
|---|---|---|---|---|---|---|
| | material | average particle size | 1st | 100th | | |
| Example 4 | $TiO_2$ | 0.2 μm | 0.20 | 0.21 | 86 | good |
| Example 5 | $SiO_2$ | 0.08 | 0.24 | 0.26 | 71 | good |
| Example 6 | $TiO_2$ | 0.2 | 0.21 | 0.21 | 55 | good |
| Ref. Ex. 1 | — | — | 0.45 | 0.78 | 240 | — |

EXAMPLE 7

A polyamic acid solution obtained by dissolving paraphenylenediamine in a amount of 30 mol. %, diaminodiphenylether in an amount of 70 mol. %, biphenyltetracarboxylic pyromellitic dianhydride in an amount of 50 mol. % and N,N-dimethylacetamide and dispersing therein $SiO_2$ particles (inorganic particles 6) with an average particle size of 200, 400, 600, 800 or 1000 Å was cast on a smooth stainless steel belt, followed by elimination of solvent at 120° C., to obtain five polyamic acid films of a thickness of about 15μ. On a face that was in contact with said stainless steel belt, of said polyamic acid film, a polyamic acid solution of the same composition as explained above, in which dispersed were $TiO_2$ particles (inorganic particles 7) of an average particle size of 0.2 μm was coated with a gravure roller and dried at 120° C. This laminated polyamic acid film was subjected to complete imitation in an oven of 400° C. to obtain a polyimide film of a total thickness of about 9 μm. The polyimide coating has surface coarseness represented by the ten-pint-averaged coarseness of 0.14 μm and the projection density of $4 \times 10^4$ projections/$mm^2$.

On the face opposite to said polyimide coating, a magnetic recording layer composed of a Co-Cr 20 wt. % film of a thickness of 0.3 μm was formed by high-frequency sputtering, and a protective layer composed of a cobalt oxide film of a thickness of 120 Å, principally consisting of $Co_3O_4$, was formed thereon. The medium was then slit into a width of 8 mm to obtain an 8-mm video tape. The prepared video tapes were subjected to the measurement of the friction coefficient of the face opposite to the magnetic recording layer on a stainless steel rod (SUS) of 4 mmφ, and the measurements of the RF output, durability in still image reproduction and dropouts (defined by an output drop of −16 dB with a duration of 15 ps) in record/reproducing operations on an 8-mm video tape recorder. As summarized in Table 3, the tapes showed low friction coefficients, satisfactory durability in still image reproduction and few dropouts. The taps of the present example not only showed stable running on the video tape recorder but were easy to handle without blocking or uneven running or winding in the steps of manufacture. Also the polyimide coating was not peeled off in the peeling test utilizing a plastic adhesive tape.

EXAMPLE 8

Three 8-mm video tapes were prepared with the same materials and process as in the Example 7, except that the inorganic particles 6 were composed of $SiO_2$ particles with an average particle size of 400 Å and the inorganic particles 7 had an average particle size of 0.03, 0.08 or 1.0$\mu$.

EXAMPLE 9

A polyimide film of a total thickness of 9 $\mu$m was prepared by reproducing the process of the Example 7, except for employing paraphenylenediamine only as the aromatic diamine component, employing 80 mol. % of biphenyltetracarboxylic dianhydride and 20 mol. % of pyromellitic dianhydride as the aromatic tetracarboxylic acid component, employing $TiO_2$ particles of an average particle size of 450 Å as the inorganic particles 6 and employing $TiO_2$ particles of an average particle size of 0.2 $\mu$m a the inorganic particles 7. On a face of said polyimide film, opposite to the polyimide coating, there was formed a magnetic recording layer of a thickness of 0.15 $\mu$m by oblique evaporation of Co-Ni 20 wt. % in a continuous electron beam evaporation apparatus. In this evaporating operation, the upper portion of the Co-Ni layer was reacted with oxygen to form a Co-Ni oxide layer of a thickness of about 200 Å at the surface of said magnetic recording layer. The 8-mm video tape was completed by forming, on said magnetic recording layer, an FEP lubricating layer of an average thickness of 15 Å by vacuum vapor deposition.

imide film had a thermal expansion coefficient of $1.9 \times 19^{-5}$ cm/cm/°C. and a tensile elasticity constant of 630 kg/mm$^2$.

On said polyimide film there was formed a Co-Cr vertical magnetic film, consisting of Co 79 wt. % and Cr 21 wt. %, with a film forming rate of 0.2$\mu$ m/min in a continuous electron beam-heated vapor deposition apparatus. The magnetic properties of thus obtained film were 4 $\pi$ Ms=4800 Gauss, Hc$^\perp$=1200 Oe and Hc″=700 Oe.

Then, on said Co-Cr film there was formed a protective cobalt oxide film of a thickness of 120 Å by reactive sputtering, and a back coating of a thickness of about 0.5 $\mu$m, containing carbon particles in a polyester binder, was formed on the rear face of the substrate film. The medium was then slit into a width of 8 mm. An organic lubricating layer, composed for example of fluorinated resin or a fatty acid ester may be further provided on the projective layer.

The surface coarseness of the thin film magnetic tape thus produced with the Co-Cr alloy was measured by the shadowing method. In said shadowing method, a heavy metal of a high efficiency of secondary electron emission such as Au-Pd is thinly evaporated, as shown in FIG. 44, obliquely from a source 11 onto a specimen 12 of the projections to be measured, and the length of shadow formed by said evaporation is observed from above, with a high-resolution electron microscope, such as a low-acceleration field-emission electron microscope. The height of each projection can be measured with an accuracy of ±8%, for an incident angle $\theta$ of vapor deposition of 85° and an Au-Pd film thickness of 10 Å.

Figure 5:
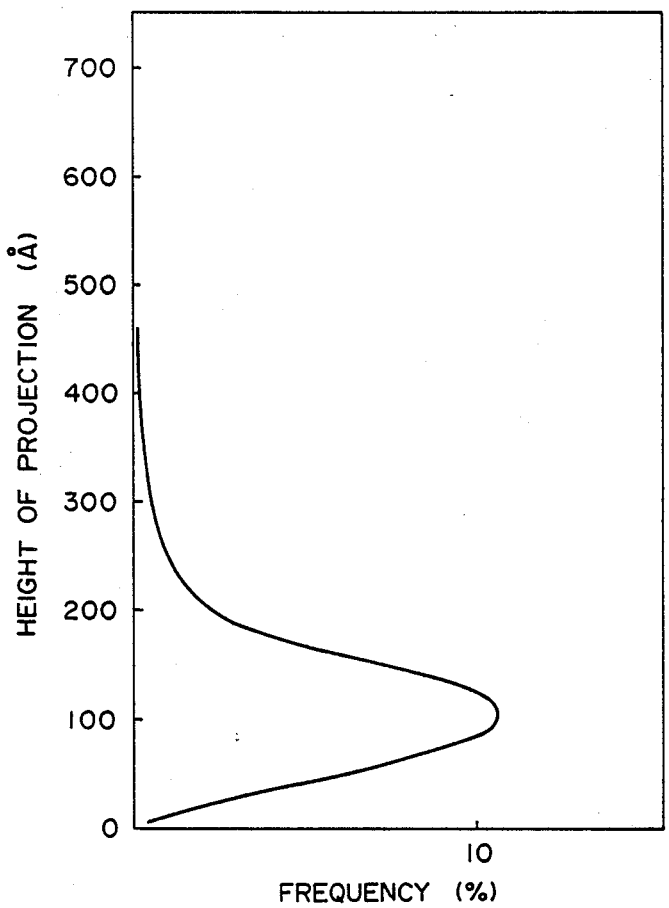

FIG. 5 shows the distribution of heights of the projections on the surface of a magnetic tape of the present example, measured as explained above. A Hitachi field emission electron microscope S-800 was used for the measurement. A similar measurement on the surface state of the polyimide substrate film proved that the distribution of the projection heights scarcely changed before and after the formation of the Co-Cr magnetic layer.

TABLE 3

| | Average particle size | | RF output | Still | | | |
| | inorg. particles 6 | inorg. particles 7 | (MP tape taken as 0 dB) | durability (min) | Dropouts (/min.) | Friction coefficient | Adhesion |
| --- | --- | --- | --- | --- | --- | --- | --- |
| Example 7 | 200Å | 0.2 $\mu$m | +4.5 dB | 30 | 80 | 0.20 | no peeling |
| | 400 | 0.2 | +3.0 dB | 60 or longer | 104 | 0.20 | no peeling |
| | 600 | 0.2 | +1.2 dB | 60 or longer | 115 | 0.20 | no peeling |
| | 800 | 0.2 | +0.5 dB | 60 or longer | 140 | 0.20 | no peeling |
| | 1000 | 0.2 | −2.5 dB | 60 or longer | 870 | 0.20 | no peeling |
| Example 8 | 400 | 0.03 | +3.0 dB | 60 or longer | 112 | 0.37 | no peeling |
| | 400 | 0.08 | +3.0 dB | 60 or longer | 95 | 0.26 | no peeling |
| | 400 | 1.0 | +3.0 dB | 60 or longer | 730 | 0.19 | no peeling |
| Example 9 | 450 | 0.2 | +1.7 dB | 60 or longer | 88 | 0.21 | no peeling |

EXAMPLE 10

A polyimide film of a thickness of 9 $\mu$m was prepared with a diamine component consisting of 80 mol. % of PPD and 20 mol. % of DADE, an acid dianhydride component consisting of 70 mol. % of BPDA and 30 mol. % of PMDA, and inorganic particles composed of $SiO_2$ particles of an average particle size of 450 Å. In adding said particles, a suitable dispersant was added to prevent the coagulation of said particles, thereby reducing the number of large projections. The obtained poly-

EXAMPLE 11

A polyimide film of a total thickness of 9 $\mu$m was prepared by coating a polyimide film of a same composition as in the Example 10 with a polyimide solution of a same composition in which $SiO_2$ particles of an average particle size of 450 Å were sufficiently dispersed. Said polyimide film had a thermal expansion coefficient and a tensile elasticity constant same as those in the Example 10. On said polyimide film there were formed a Co-Cr alloy magnetic layer, a protective cobalt oxide layer and a back coating in the same manner as in the Example 10.

Figure 6:
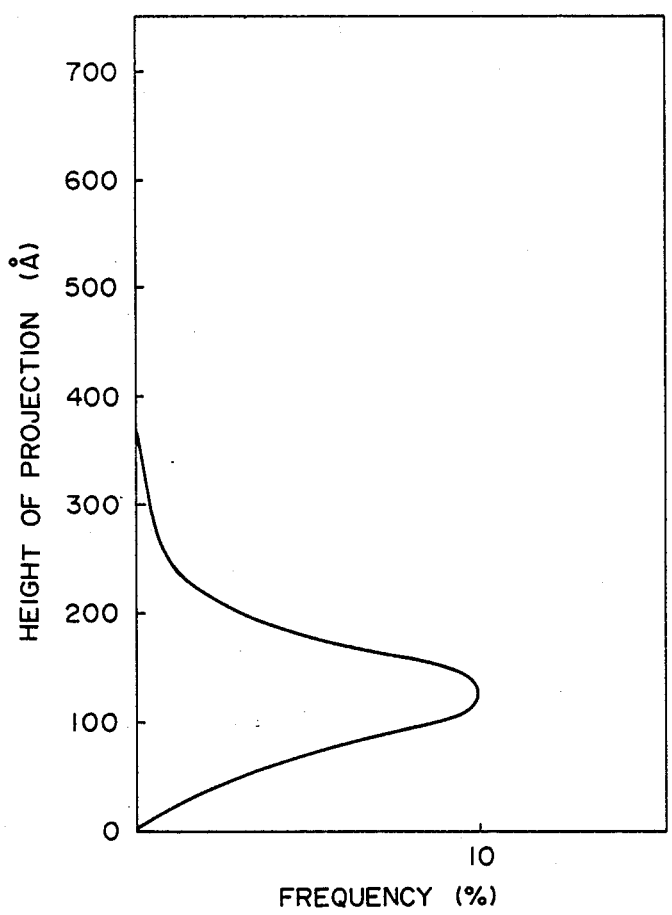

FIG. 6 shows the result of measurement of the surface coarseness of the magnetic tape of the present example by the shadowing method. In comparison with the preceding Example 10, the inorganic particles were dispersed better so that the taller portion decreased. Also the value $H_{0.1}-H_1$ decreased.

REFERENCE EXAMPLE 2

Figure 7:
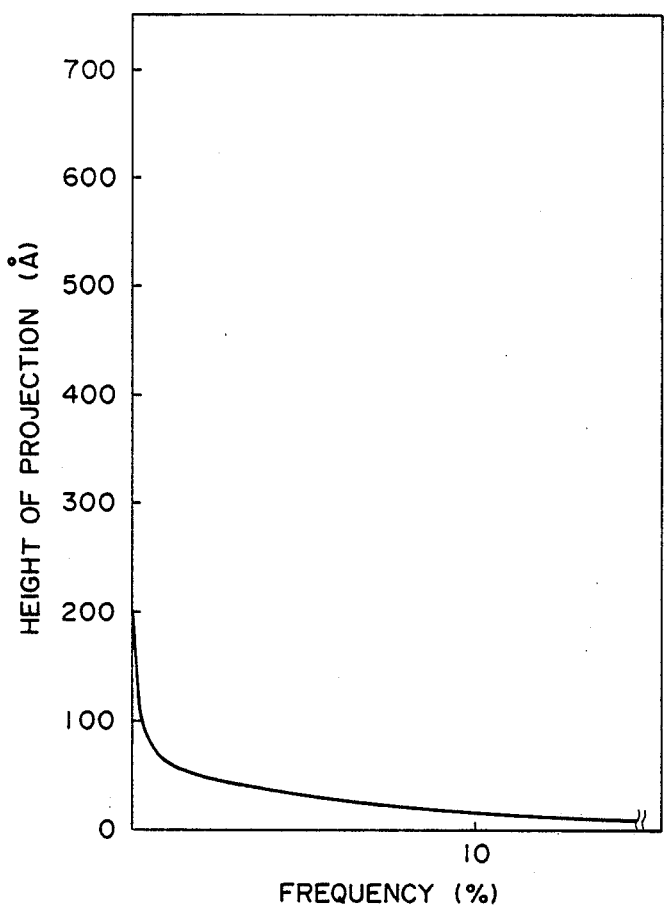

A polyimide film of a thickness of 9 μm was prepared with the same composition and process as in the Example 10, except that $SiO_2$ particles were not employed. FIG. 7 shows the result of measurement of the surface coarseness of the magnetic tape of this reference example, obtained by the shadowing method. The projections present on this tape were principally due to surface defects such as scars and dusts. Consequently the distribution of the projection heights varies according to the position.

REFERENCE EXAMPLE 3

A polyimide film of a thickness of 9 μm was prepared by dispersing, in a polyimide solution of a composition same a that in the Example 10, $TiO_2$ particles with uneven particle sizes in a range from 100 to 500 Å. The particles were not sufficiently dispersed at the addition. A magnetic tape was prepared with otherwise same conditions.

Figure 8:
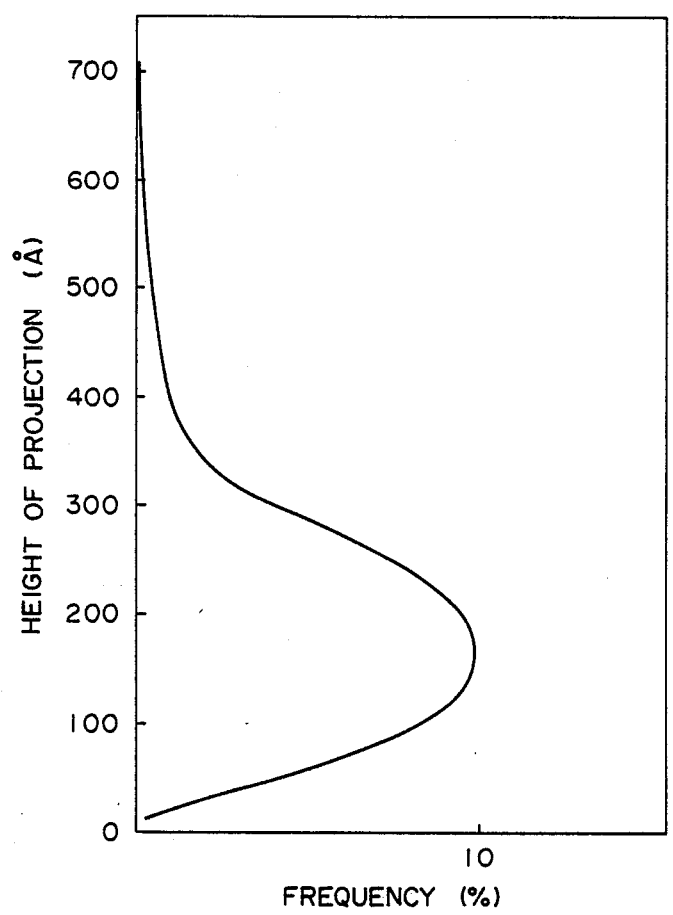

FIG. 8 shows the result of measurement of the surface coarseness, by the shadowing method, of the magnetic tape of the present reference example. Though the particle size is smaller than that in the Example 10 or 11, the distribution extends even to a larger height, indicating the presence of coagulated granules in the substrate film. This fat was also confirmed by observation of the surface under a scanning electron microscope.

and two diamine components, at a weight concentration of about 33%. In this state the solution was extremely viscous, with a rotary viscosity of ca. 25,000 cp.

Said solution was transferred to a kneader with a heater, and simultaneously added were 35 grs. of $SiO_2$ particles prepared to an average particle size of 400 Å (a product of Shokubai Kasei Kogyo Co., Ltd. known under a trade name OSCAL). An initial dispersion was conducted by kneading or 24 hours at 50° C., thereby obtaining uniform particle size with reduced deviation. Said $SiO_2$ particles were subjected to a surface treatment with a coupling agent, prior to the addition to the polyamic acid solution. In said surface treatment the $SiO_2$ particles were at first washed with methanol and then with acetone under the application of ultrasonic wave, then added to a dilute solution of the coupling agent, agitated for 6 hours, then separated from said solution and dried at 80° C. Generally silane coupling agents are effective, but the use of a heat-resistant coupling agent having an aromatic ring structure is desirable since the film has to be subjected to high heat treatment temperatures in continuous manner in the manufacture. A preferred example is represented by the following formula:

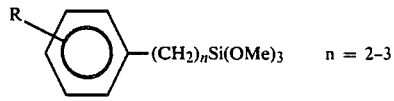

wherein $R = CH_2NH_2$, $CH_2Cl$, $NH_2$ or $CH_2NHCH_2CH_2NH_2$.

After the dispersion, the solution is transferred to a sand mill with a heater, and 9.8 kgs. of N-methylpyrrolidone preheated to 50° C. were gradually added under agitation to dilute the solution to a solid content of 20%. Then dispersion was conducted in the sand mill for 24

TABLE 4

| | Surface characteristics | | | | Tape characteristics | | | |
|---|---|---|---|---|---|---|---|---|
| | Projection height (measured by shadowing method A) | | | Projection density (/mm²) | Luminance signal output (dB) (*4) | Durability in repeated use (passes) | Durability in still image reproduction (min.) | Total evaluation |
| | $H_{0.01}$ (*1) | $H_{0.1}$ (*2) | $H_1$ (*3) | | | | | |
| Example 10 | 440 | 400 | 250 | 5 × 10⁶ | +1.5 | >200 | >120 | |
| Example 11 | 350 | 320 | 240 | 5 × 10⁶ | +3.0 | >200 | >120 | |
| Ref. Ex. 2 | 190 | 120 | 50 | 1 × 10³ | +5.0 | 20 | 10 | X |
| Ref. Ex. 3 | 670 | 570 | 350 | 5 × 10⁵ | −1.0 | >200 | >120 | X |

Figure 16:
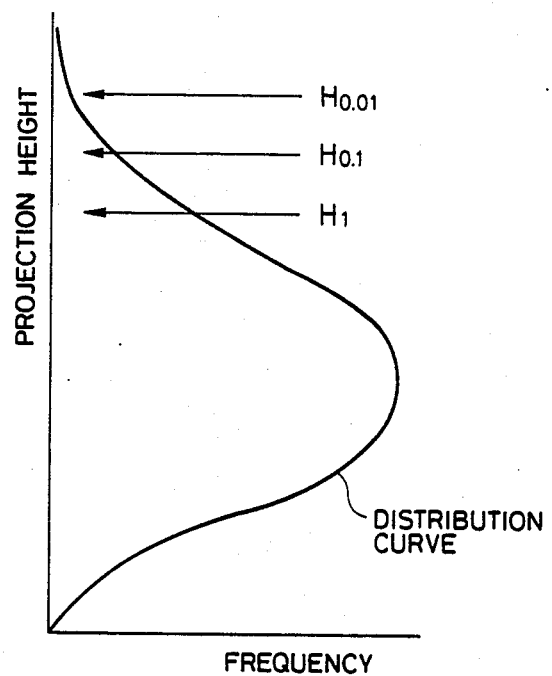
FIG. 16 is a graph showing projection height, $H_{0.01}$, $H_{0.1}$ and H, corresponding to 0.01%, 0.1% and 1% respectively, of all projections counted from the highest side, mentioned in Table 4.

(*1) $H_{0.01}$ is a projection height corresponding to 0.01% of all projections counted from the highest side (see FIG. 16)
(*2) $H_{0.1}$ is a projection height corresponding to 0.1% of all projections counted from the highest side (see FIG. 16)
(*3) $H_1$ is a projection height corresponding to 1% of all projections counted from the highest side (see FIG. 16)
(*4) Output compared with that of a commercial metal power tape

EXAMPLE 12

There will be explained a vertical magnetic recording medium prepared by forming surface coarseness with $SiO_2$ particles dispersed in an aromatic polyimide film, and depositing a Co-Cr alloy film by sputtering.

Figure 9:
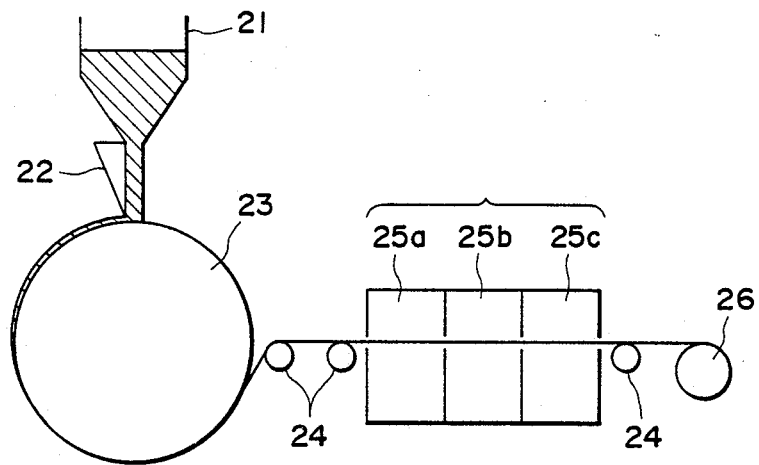
FIG. 9 is a lateral view of a casting apparatus utilized in the preparation of the magnetic recording medium of the present invention.

7 moles of 3,3',4,4'-biphenyltetracarboxylic dianhydride (BPDA), 3 moles of pyromellitic dianhydride (PMDA), 6 moles of paraphenylenedimmine (PPD), 4 moles of diaminodiphynylether (DADE) and 10 kgs. of N-methylpyrrolidone were simultaneously charged in a cylindrical polymerization tank, and were condensation polymerized for 44 hours under agitation at 50° C. and under atmospheric pressure. The reaction solution contained a copolymerized polyamic acid consisting of the above-mentioned two tetracarboxylic acid components hours. The rotary viscosity of the solution in this state was 4000 cp. The viscosity of the solution was not at all affected by the amount of addition of $SiO_2$ particles and by the particle size thereof, since the amount of addition was small compared to the total amount of solution. The obtained solution was formed into a film by casting on a casting apparatus shown in FIG. 9, in which there are shown a container 21 for supplying the raw material solution; a die 22 for determining the coating thickness; a casting drum 23; a free roller 24; a high temperature oven with three zones 25a, 25b, 25c; and a take-up roller 26. In the present example the die 22 was so adjusted to obtain a wet coating thickness of about 60 μm or a dry film thickness of 10 μm. The casting drum 23 was heated to 170° C., and the semi-dried film peeled off from the casting drum had a thickness of about 20 μm. Said semi-dried film was heated to 420° C. in two zones 25a, 25b of the high temperature oven to complete the imidation and the elimination of solvent. In the present example the zone 25c was not heated. The distribution of the projection heights created by the SiO₂ particles is affected to a certain extent by the drying conditions in the film formation. In the apparatus shown in FIG. 9, the drying on the casting drum principally executes elimination of the solvent, while the high temperature oven executes imidation of the polyamic acid together with elimination of the solvent. The formation of projection principally occurs in the high-temperature oven where the SiO₂ particles project on the surface by the elimination of solvent and are fixed simultaneously by the amidation. In general, rapid heating at a higher temperature generates more prominent projections.

Figure 10:
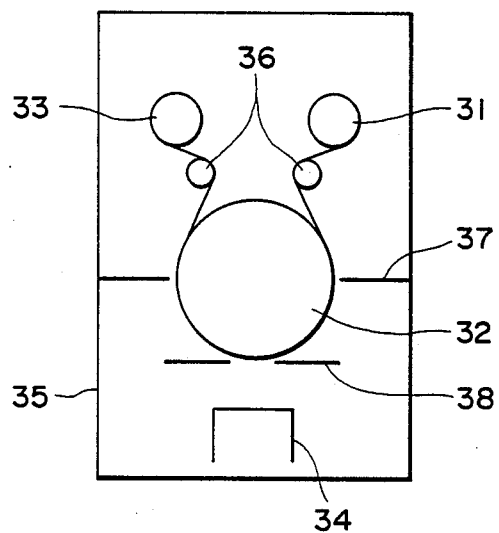
FIG. 10 is a lateral view of a sputtering apparatus utilized in the preparation of the magnetic recording medium of the present invention.

A magnetic recording medium was prepared by sputtering a Co-Cr alloy magnetic layer on a polyimide film of a thickness of 10 μm obtained in the above-explained process. FIG. 10 schematically shows the sputtering apparatus, wherein shown are a polyimide film 31 slit into a width of 100 mm; a rotary drum 32 heated to 150° C.; a film 33 wound after the formation of the magnetic layer; a Co-Cr alloy target (Cr 20%) 34; a vacuum chamber 35; and a free roller 36. The vacuum chamber 35 was divided by a partition 37 into an upper and a lower space, which were respectively evacuated by an unrepresented oil diffusion pump and an unrepresented clio pump. The sputtering was conducted with an RF magnetron, with an Ar pressure of 0.50 pa in the lower space, an RF power of 2 kW and a film forming rate of about 2000 Å/min. A mask 38 was provided for limiting the incident angle. The formed film had a thickness of ca. 0.35 μm, with magnetic characteristics of $4 \times Ms = 4500$ G, $Hc^\perp = 1200$ Oe and $Hc'' = 700$ Oe.

The film having said Co-Cr magnetic layer was further subjected to the formation of a protective cobalt oxide layer of a thickness of ca. 100 Å, and the application of a back coating of a thickness of 0.5 μm composed of a polyester binder containing carbon particles, and then slit into a width of 8 mm. An organic lubricating layer for example of a fluorinated resin or a fatty acid ester may be further provided on said protective film.

Figure 11:
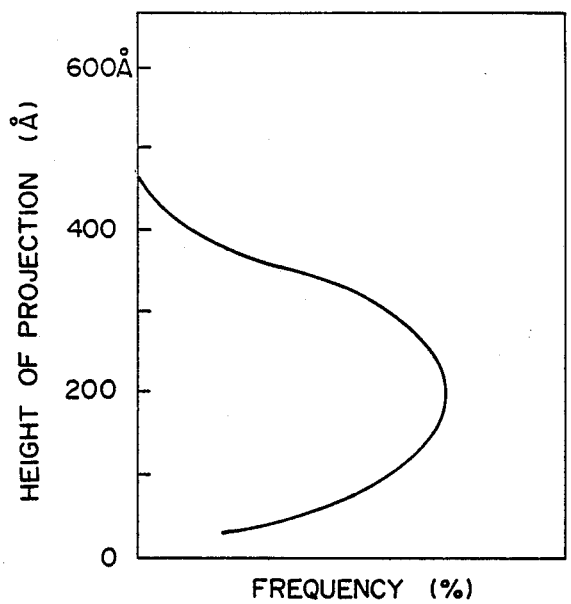

The surface coarseness of the Co-Cr thin film magnetic tape thus produced was measured by the shadowing method. FIG. 11 shows the result of measurement of the projection heights on the surface of said magnetic tape. The measurement was conducted with a Hitachi field emission scanning electro microscope (FE-SEM) S-800. A similar measurement of the surface of the polyimide film revealed that the distribution of the projection heights scarcely changed before and after the formation of the magnetic layer.

The coagulation state of the particles over the plane was evaluated by observation under the above-mentioned low acceleration scanning electron microscope, with a magnification of about 3000 times. The number of large projections was counted in an observation area of 7000 μm², and the dispersion was identified as insufficient if said number exceeded 0.01% of the total number of projections.

EXAMPLE 13

A magnetic tape was prepared by reproducing the process of the Example 12, except for the drying conditions in the preparation of the polyimide film. In the high temperature oven, the zone 25a was set at 400° C. and the zones 25b, 25c were set at 370° C. to realize a slower reaction than in the Example 12. The Co-Cr alloy magnetic layer, protective cobalt oxide film and back coating were formed on the polyimide film in the same manner a in the Example 12.

Figure 12:
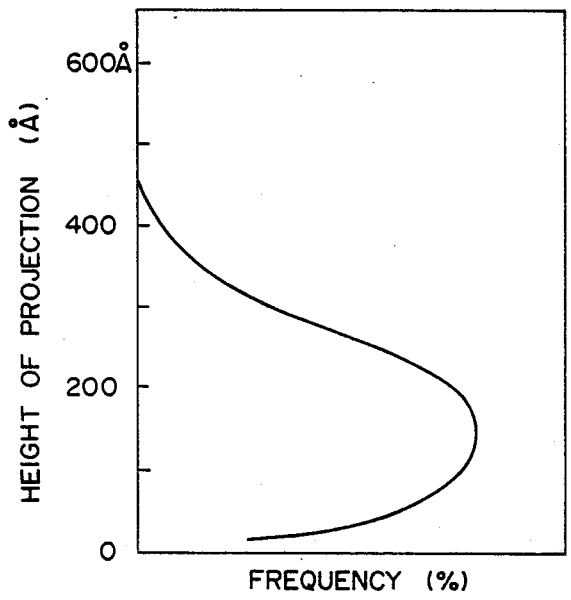

FIG. 12 shows the result of measurement, by the shadowing method, of the surface coarseness of the magnetic tape of the present example. The maximum height of projections is same as that in the Example 12, as it is determined by the particle size of the inorganic particles, but the projection heights are generally lower, due to the slower reactions of elimination of solvent and of imidationin the oven.

EXAMPLE 14

Figure 13:
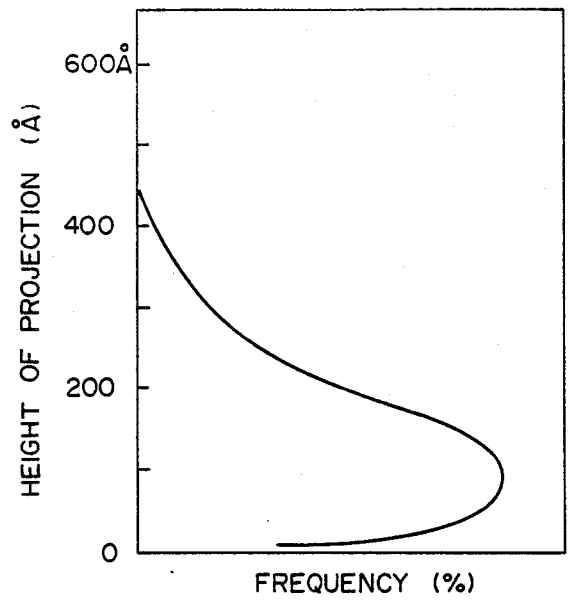

The process of the Example 12 was reproduced, except that all the zones 25a, 25b, 25c of the high temperature oven were set at 370° C. FIG. 13 shows the result of measurement, by the shadowing method, of the surface coarseness of the magnetic tape of the present example.

REFERENCE EXAMPLE 4

Figure 14:
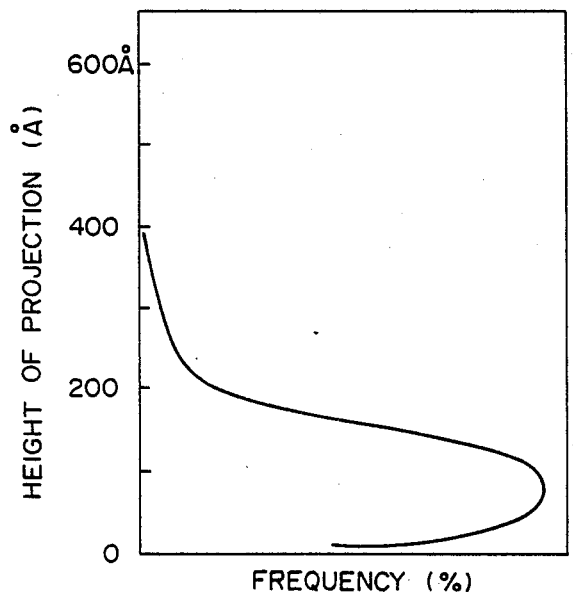

The process of the Example 12 was reproduced except that all the zones 25a, 25b, 25c of the high temperature oven were set at 350° C. FIG. 14 shows he result of measurement, by the shadowing method, of the surface coarseness of the magnetic tape of the present example.

REFERENCE EXAMPLE 5

The process of the Example 12 was reproduced, except that all the zones 25a, 25b, 25c of the high temperature oven were set at 330° C. FIG. 15 shows the result of measurement, by the shadowing method, of the surface coarseness of the magnetic tape of the present example.

EXAMPLE 15

The process of the Example 12 was reproduced, except that the SiO₂ particles to be added had an average particle size of 800 Å.

EXAMPLE 16

The process of the Example 12 was reproduced, except that the SiO₂ particles to be added had an average particle size of 600 Å.

EXAMPLE 17

The process of the Example 12 was reproduced, except that the SiO₂ particles to be added had an average particle size of 200 Å.

REFERENCE EXAMPLE 6

The process of the Example 22 was reproduced, except that the SiO₂ particles to be added had an average particle size of 120 Å.

TABLE 5

|  | Dispersion state | $H_{0.01}$ (Å) | $H_{0.1}$ (Å) | $H_1$ (Å) | Particle size of inorganic particles (Å) | Luminance signal output (dB $V_{pp}$) | Drop outs (/min.) | Durability in still reproduction (minutes) | Durability in repeated use (passes) |
|---|---|---|---|---|---|---|---|---|---|
| Example 12 | good | 350 | 270 | 220 | 400 | 0 | 120 | >60 | >200 |
| Example 13 | good | 340 | 230 | 200 | 400 | 0 | 100 | >60 | >200 |
| Example 14 | good | 300 | 180 | 150 | 400 | +0.6 | 100 | 30 | >200 |
| Example 15 | good | 710 | 500 | 420 | 800 | −2.8 | 350 | >60 | >200 |
| Example 16 | good | 490 | 350 | 280 | 600 | −1.9 | 90 | >60 | >200 |
| Example 17 | good | 180 | 140 | 120 | 200 | +1.7 | 80 | 30 | ~200 |
| Ref. Ex. 4 | good | 290 | 120 | 100 | 400 | +0.6 | 90 | 15 | 100 |
| Ref. Ex. 5 | good | 290 | 100 | 70 | 400 | +1.1 | 70 | 15 | 50 |
| Ref. Ex. 6 | good | 90 | 60 | 40 | 120 | +2.3 | 70 | 5 | 10 |

What is claimed is:

1. A magnetic recording medium comprising a substrate composed of a polyamide film containing inorganic particles dispersed therein and bearing, on a face thereof, a polyimide coated layer containing inorganic articles dispersed therein, and a magnetic recording layer formed on the other face of said polyimide film, wherein the average particle size of the inorganic particles dispersed in said polyimide film is less than that of the inorganic particles dispersed in said polyimide coated layer and said polyimide film containing the inorganic particles dispersed therein has a surface coarseness representing by a 10-point averaged coarseness in a range from 100 to 60 A and a projection density in a range from $10^5$ to $10^8$ projections/mm$^2$, and said polyimide coated layer containing the inorganic particles dispersed therein has a surface coarseness represented by a 10-point-averaged coarseness in a range from 0.05 to 0.5 μm and a projection density at least equal to $10^4$ projections/mm$^2$.

2. A magnetic recording medium compressing a magnetic recording layer formed by a thin film deposition process on a polyimide, polyamide, polyimidamide, polyetherimide or polysulfon substrate, wherein said substrate is provided, on a surface thereof, with small projections at a density of $10^5$ to $10^8$ projections/mm$^2$, the statistical distribution of the heights of said projections satisfying the following relations: $H_{0.01} < 600$ A; $H_{0.1} > 120A$; $H_1 > 100A$ and $H_{0.1} - H_1 < 200A$, wherein $H_{0.01}$, $H_{0.1}$ and $H_1$ are the heights of projections respectfully corresponding to 0.01%, 0.1% and 1% of the total number of projections in the descending order of height.

3. A magnetic recording medium comprising a magnetic recording layer formed by a thin film deposition process on a polyimide, polyamide, polyimidamide, polyetherimide or polysulfon substrate containing inorganic particles dispersed therein, wherein said substrate is provided, on a surface thereof, with small projections having a density of $10^5$ to $10^8$ projections/mm$^2$, wherein said inorganic particles are mostly primary particles, and wherein the distribution of the heights of projections on the surface of the substrate satisfies the following relations:

$H_{0.01}$ is less than average particle size $H_{0.1} > 120A$ $H_1 > 0.35d$ wherein d is the average particle size of the inorganic particles; and $H_{0.01}$, $H_{0.1}$ and $H_1$ are the heights of projections respectively corresponding to 0.01% 0.1% and 1% of the total number of projections in the descending order of height.

4. A magnetic recording medium according to claim 2, wherein $H_{0.01}$ is <350A.

5. A magnetic recording medium according to claim 2, wherein $H_{0.1}$ is >180A.

6. A magnetic recording medium according to claim 2, wherein $H_{0.1} - H_1$ is <150A.

7. A magnetic recording medium according to claim 3, wherein $H_{0.01}$ is <0.8 d.

8. A magnetic recording medium according to claim 3, wherein $H_{0.1}$ is >180A.

9. A magnetic recording medium according to claim 3, wherein $H_1$ is >0.5 d.

10. A magnetic recording medium according to claim 3, which is disc-shaped and wherein $H_1$ is >0.42 d.

11. A magnetic recording medium according to claim 10, wherein $H_1$ >0.55 d.

* * * * *

UNITED STATES PATENT AND TRADEMARK OFFICE
CERTIFICATE OF CORRECTION

PATENT NO. : 4,910,068
DATED : March 20, 1990
INVENTOR(S) : HIROSHI TAKAGI ET AL.     Page 1 of 5

It is certified that error appears in the above-identified patent and that said Letters Patent is hereby corrected as shown below:

AT [57] ABSTRACT

"$H_{0.01} > 120 Å$" should read --$H_{0.1} > 120 Å$--.

COLUMN 2

Line 5, "o" should read --of--.

COLUMN 3

Line 4, "tee" should read --the--.
Line 32, "polyamideacid" should read --polyamic acid--.
Line 34, "imitation" should read --imidation--.
Line 41, "diaminodipeenylether," should read --diaminodiphenylether,--.

COLUMN 4

Line 4, "o" should read --of--.
Line 60, "tee" should read --the--.

COLUMN 5

Line 36, "recoding" should read --recording--.
Line 62, "th" should read --the--.

COLUMN 7

Line 30, "magnetic recording layer 03." should read --magnetic recording layer 3.--.
Line 59, "regulates" should read --regulate--.

UNITED STATES PATENT AND TRADEMARK OFFICE
CERTIFICATE OF CORRECTION

PATENT NO. : 4,910,068

DATED : March 20, 1990

INVENTOR(S) : HIROSHI TAKAGI ET AL.   Page 2 of 5

It is certified that error appears in the above-identified patent and that said Letters Patent is hereby corrected as shown below:

COLUMN 8

Line 14, "only" should be deleted.
Line 46, "tends" should read --tend--.
Line 54, " $\int_{H_{0.01}}^{\infty} f(h)dh / \int_{0}^{\infty} f(h)dh = 0.0001.$ "
should read
-- $\int_{H_{0.01}}^{\infty} f(h)dh / \int_{0}^{\infty} f(h)dh = 0.0001.$ --.

COLUMN 9

Line 10, "a" should be deleted.
Line 13, "an" should read --and--.
Line 14, "$H_{0.01}-H_1<200Å,$" should read --$H_{0.1}-H_1<200Å,$--.
Line 15, "$H_{0.1}-H_2<150Å.$" should read --$H_{0.1}-H_1<150Å.$--.

COLUMN 10

Line 23, "an" should read --and--.
Line 29, "he" shoudl read --the--.

COLUMN 11

Line 6, "wit" should read --with--.
Line 34, "Co 80% Cr 20%" should read --Co 80% - Cr 20%--.
LIne 36, "hated" should read --heated--.

UNITED STATES PATENT AND TRADEMARK OFFICE
CERTIFICATE OF CORRECTION

PATENT NO. : 4,910,068
DATED : March 20, 1990
INVENTOR(S) : HIROSHI TAKAGI ET AL.    Page 3 of 5

It is certified that error appears in the above-identified patent and that said Letters Patent is hereby corrected as shown below:

COLUMN 12

Line 47, "tee" should read --the--.
   Table 1, "$\geq$ 60 minutes" should read --$\geqq$ 60 minutes--.

COLUMN 13

Line 5, "diaminodiphenyether" should read
       --diaminodiphenylether--.
   Line 8, "N, N-dimethylacttamide" should read
       --N, N-dimethylacetamide--.
   Line 65, "result" should read --resulted--.
   Line 67, "damages" should read --damage--.

COLUMN 14

Line 39, "racarboxylic pyromellitic" should read
       --racarboxylic dianhydride in an amount
         of 50 mol.% and pyromellitic--.
   Line 40, "and" (first occurrence) should read --in--.
   Line 52, "imitation" should read --imidation--.
   Line 55, "ten-pint averaged coarseness" should read
       --ten-point averaged coarseness--.

COLUMN 15

Line 2, "15 ps)" should read --15 µs)--.
   Line 6, "taps" should read --tapes--.

UNITED STATES PATENT AND TRADEMARK OFFICE
CERTIFICATE OF CORRECTION

PATENT NO. : 4,910,068

DATED : March 20, 1990

INVENTOR(S) : HIROSHI TAKAGI ET AL.

It is certified that error appears in the above-identified patent and that said Letters Patent is hereby corrected as shown below:

COLUMN 16

Figure 4:
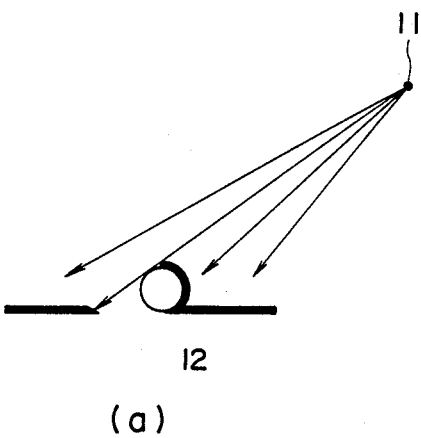
FIGS. 4(a) and 4(b) are schematic views showing the principle of shadowing method.
Figure 4:
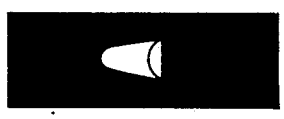

Line 19, "projective layer." should read --protective layer.--.
    Line 25, "FIG. 44," should read --FIG. 4,--.

COLUMN 17

Line 18, "dusts." should read --dust.--.
    Line 25, "a" should read --as--.
    Line 36, "fat" should read --fact--.
    Table 4, "method Å" should read --method) (Å)-- and " " should read --⊚--.
    Line 61, "paraphenylenedimmine (PPD)," should read --paraphenylenedimine (PPD),--.
    Line 62, "diaminodiphynylether (DADE)" should read --diaminodiphenylether (DADE)--.

COLUMN 18

Line 9, "or" should read --for--.

COLUMN 19

Line 19, "amidation." should read --imidation.--.
    Line 40, "4XMs=4500 G," should read --4πMs=4500 G,--.

UNITED STATES PATENT AND TRADEMARK OFFICE
CERTIFICATE OF CORRECTION

PATENT NO. : 4,910,068
DATED : March 20, 1990
INVENTOR(S) : HIROSHI TAKAGI ET AL.   Page 5 of 5

It is certified that error appears in the above-identified patent and that said Letters Patent is hereby corrected as shown below:

COLUMN 20

Line 14, "a" should read --as--.
Line 22, "imidationin" should read --imidation in--.
Line 36, "he" should read --the--.
Line 52, "800 U." should read --800 Å."
Line 65, "Example 22" should read --Example 12--.

COLUMN 21

Line 27, "representing" should read --represented--.
Line 29, "60A" should read --600A--.
Line 36, "compressing" should read --comprising--.

COLUMN 22

Line 33, "0.01%" should read 0.01%,--.

Signed and Sealed this

Tenth Day of March, 1992

Attest:

HARRY F. MANBECK, JR.

Attesting Officer    Commissioner of Patents and Trademarks